United States Patent [19]
Otto

[11] Patent Number: 5,161,590
[45] Date of Patent: Nov. 10, 1992

[54] MITER SAW TABLE APPARATUS

[76] Inventor: David L. Otto, Rte. 3, Box 119, Frostburg, Md. 21532

[21] Appl. No.: 826,033

[22] Filed: Jan. 27, 1992

[51] Int. Cl.⁵ ............................ B27C 9/00; B25H 1/16
[52] U.S. Cl. .................................. 144/286 R; 83/471; 83/471.3; 83/574; 144/285; 144/287; 269/901
[58] Field of Search ................. 144/1 R, 242 C, 285, 144/286 R, 286 A, 287; 83/471, 471.3, 574, 859; 108/48, 127; 269/901, 289

[56] References Cited

U.S. PATENT DOCUMENTS

| | | | |
|---|---|---|---|
| 1,860,071 | 5/1932 | Bodkin | 144/285 |
| 2,653,634 | 9/1953 | Mott | 144/285 |
| 4,640,326 | 2/1987 | Hewitt | 144/287 |
| 4,753,279 | 6/1988 | Harris | 144/287 |
| 4,852,623 | 8/1889 | Rodrigues | 144/286 R |
| 4,974,651 | 12/1990 | Carmon et al. | 144/286 R |

*Primary Examiner*—W. Donald Bray
*Attorney, Agent, or Firm*—Leon Gilden

[57] ABSTRACT

A saw table including a housing cabinet mounting a miter saw, with the mounting platform longitudinally aligned relative to the housing cabinet, with a top surface of the mounting platform positioned below a top surface of the housing cabinet, whereupon the mounting of a miter saw table thereto provides planar alignment of the top surface of the miter saw table relative to the top wall of the housing cabinet. The housing cabinet further is further provided with a plurality of compartments for the storage of various components associated with a sawing procedure. The mounting platform is provided with a rear abutment flange cooperative with forward clamp legs to secure the miter saw table relative to the mounting platform.

6 Claims, 4 Drawing Sheets

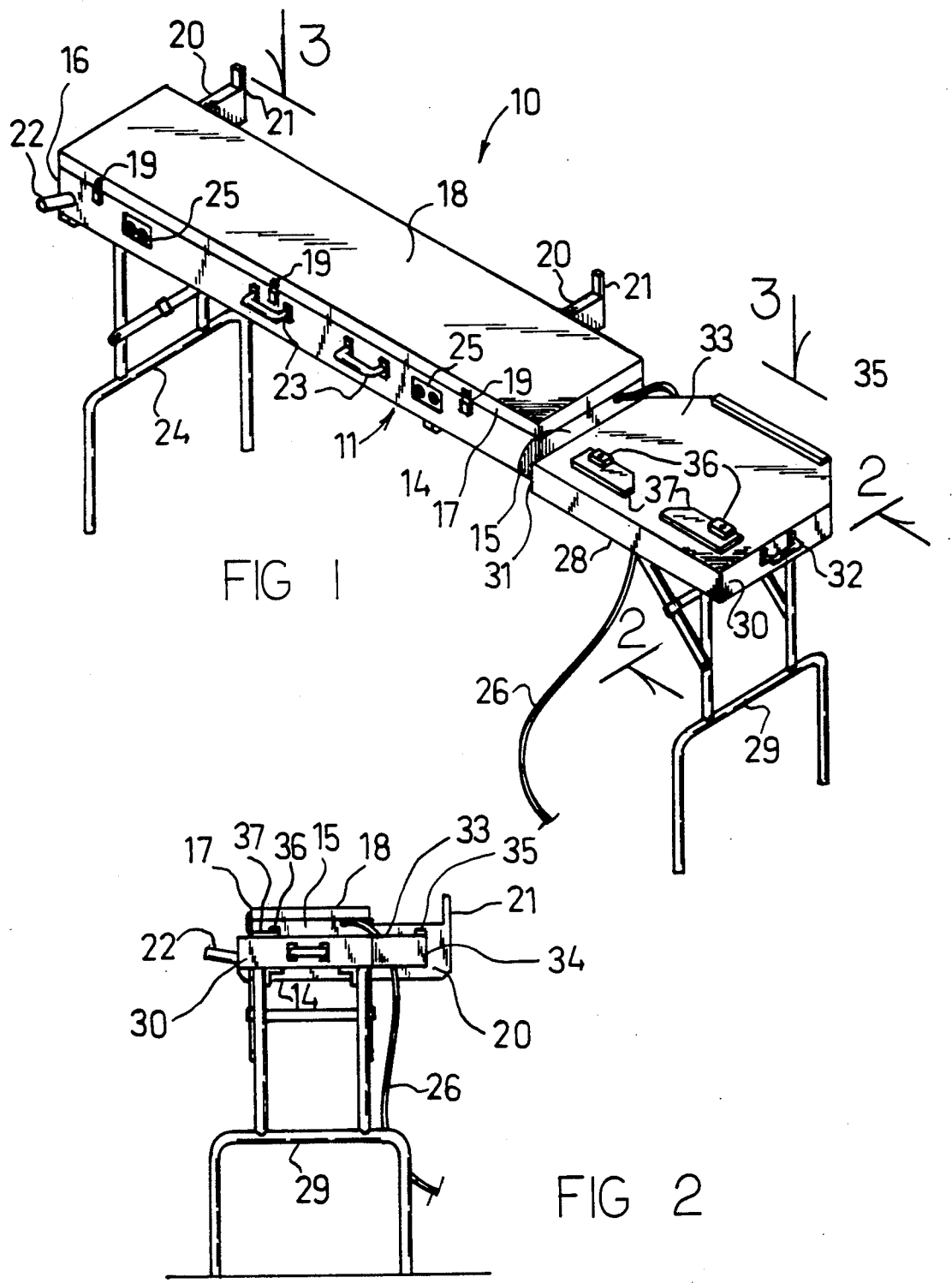

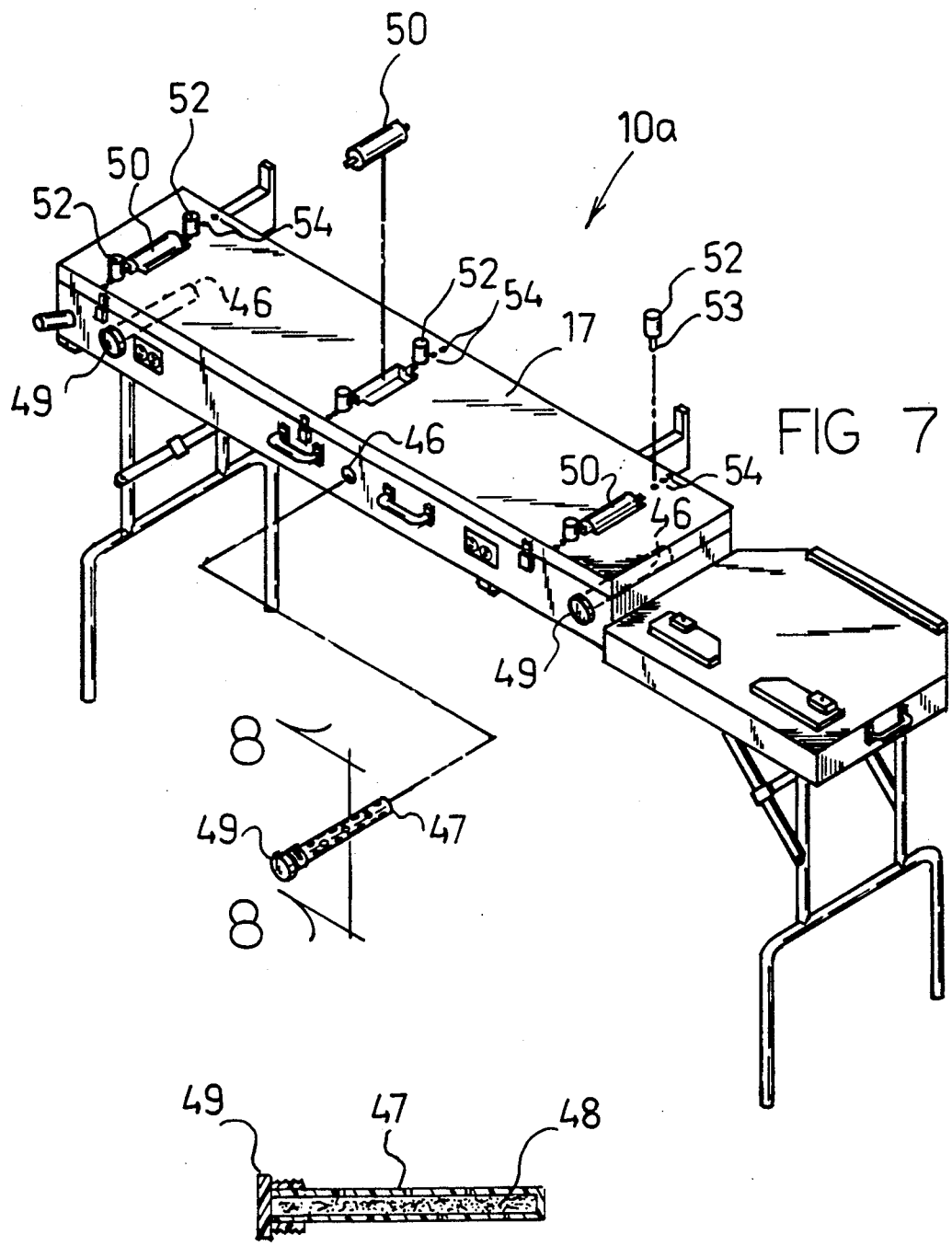

MITER SAW TABLE APPARATUS

BACKGROUND OF THE INVENTION

1. Field of the Invention

The field of invention relates to saw table apparatus, and more particularly pertains to a new and improved miter saw table apparatus wherein the same is arranged for the provision of a cooperative saw table structure for use in a miter saw cutting procedure.

2. Description of the Prior Art

Miter saws of various types are utilized throughout the prior art. Frequently in the severing of elongate workpieces, the workpieces are arranged to deflect relative to a miter saw table top surface, wherein the instant invention attempts to address the problems associated with the prior art by providing a miter saw table structure providing for elongate support of workpieces, as well as provision for the storage, easy transport, and compact nature of the organization.

Prior art saw table structure is exemplified in U.S. Pat. No. 4,531,441 to Bergler setting forth a combination of a table and miter saw wherein the miter saw is arranged for mounting to the associated support table.

U.S. Pat. No. 4,874,025 to Cleveland sets forth a miter saw support stand wherein a recessed central position is positioned below lateral wings mounted relative to the central portion.

As such, it may be appreciated that there continues to be a need for a new and improved miter saw table apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of miter saw table apparatus now present in the prior art, the present invention provides a miter saw table apparatus wherein the same is arranged for the provision of a miter saw table for ease of use as well as compact portability and transport of the organization during periods of non-use. As such, the general purpose of the present invention, which will be described subsequently in greater detail, is to provide a new and improved miter saw table apparatus which has all the advantages of the prior art miter saw table apparatus and none of the disadvantages.

To attain this, the present invention provides a saw table including a housing cabinet mounting a miter saw, with the mounting platform longitudinally aligned relative to the housing cabinet, with a top surface of the mounting platform positioned below a top surface of the housing cabinet, whereupon the mounting of a miter saw table thereto provides planar alignment of the top surface of the miter saw table relative to the top wall of the housing cabinet. The housing cabinet further is provided with a plurality of compartments for the storage of various components associated with a sawing procedure. The mounting platform is provided with a rear abutment flange cooperative with the forward clamp legs to secure the miter saw table relative to the mounting platform.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved miter saw table apparatus which has all the advantages of the prior art miter saw table apparatus and none of the disadvantages.

It is another object of the present invention to provide a new and improved miter saw table apparatus which may be easily and efficiently manufactured and marketed.

It is a further object of the present invention to provide a new and improved miter saw table apparatus which is of a durable and reliable construction.

An even further object of the present invention is to provide a new and improved miter saw table apparatus which is susceptible of a low cost of manufacture with regard to both materials and labor, and which accordingly is then susceptible of low prices of sale to the consuming public, thereby making such miter saw table apparatus economically available to the buying public.

Still yet another object of the present invention is to provide a new and improved miter saw table apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic end view of the instant invention, taken along the lines 2—2 of FIG. 1 in the direction indicated by the arrows.

FIG. 7 is an isometric illustration of a modification of the invention.

FIG. 8 is an orthographic view, taken along the lines 8—8 of FIG. 7 in the direction indicated by the arrows.

DESCRIPTION OF THE PREFERRED EMBODIMENT

Figure 3:
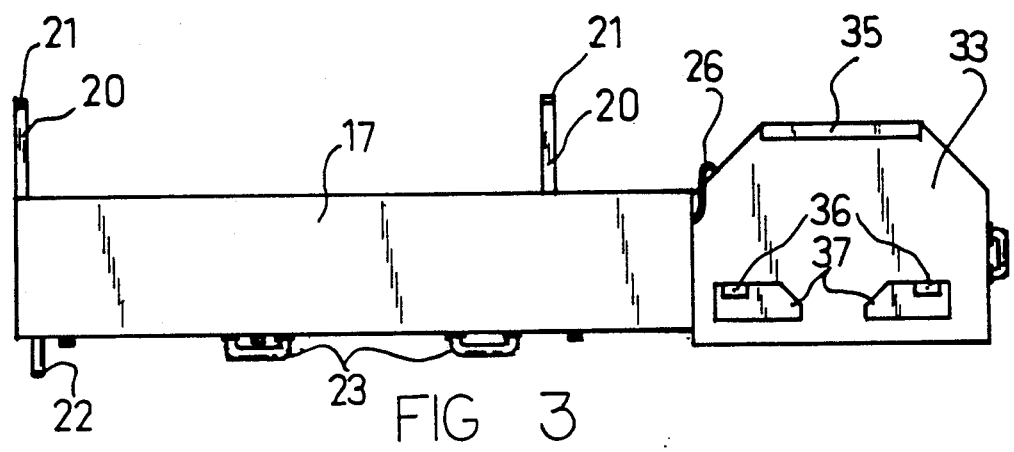
FIG. 3 is an orthographic view, take along the lines 3—3 of FIG. 1 in the direction indicated by the arrows.

With reference now to the drawings, and in particular to FIGS. 1 to 8 thereof, a new and improved miter saw table apparatus embodying the principles and concepts of the present invention and generally designated by the reference numerals 10 and 10a will be described.

Figure 4:
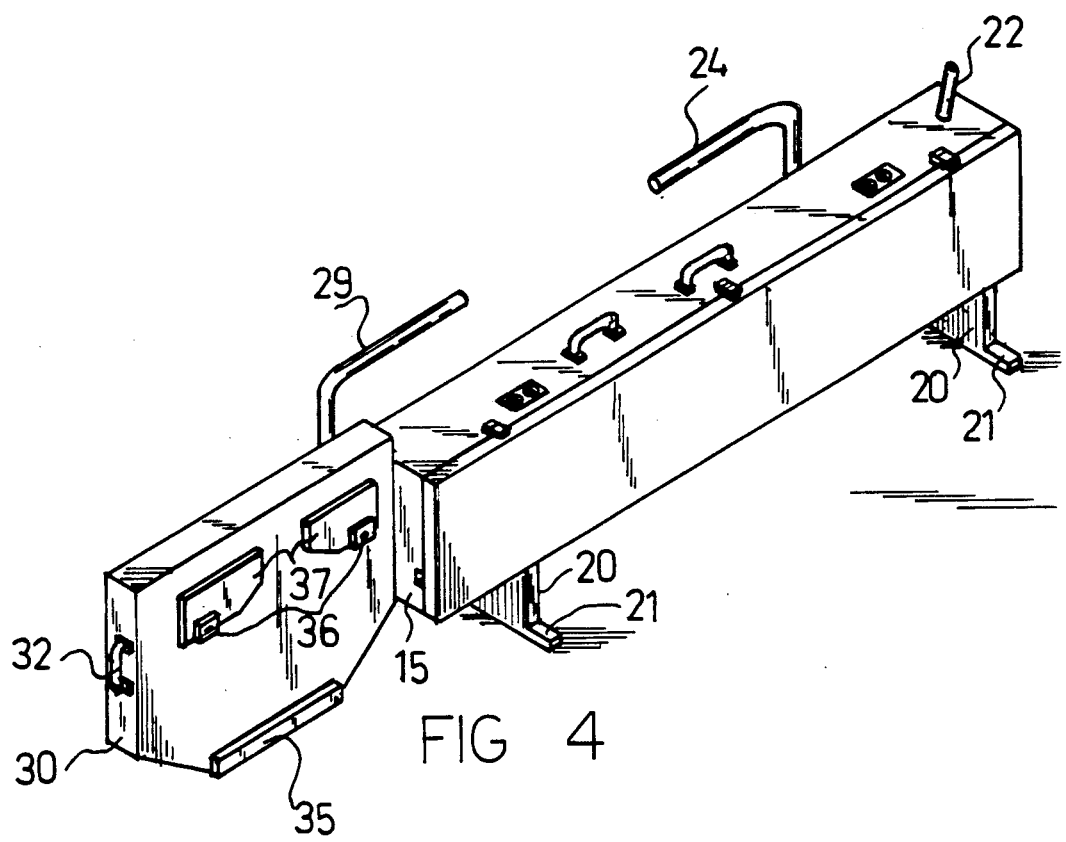
FIG. 4 is an isometric illustration of the invention in an inter-folded configuration for transport thereof.

More specifically, the miter saw table apparatus 10 of the instant invention essentially comprises a cabinet housing 11, including a housing front wall 12 spaced from and parallel a housing rear wall 13. A housing bottom wall 14 extends orthogonally and coextensively relative to the front and rear walls terminating in a housing first end wall 15 spaced from and parallel a housing second end wall 16. A housing lid 17 is hingedly mounted to the housing rear wall and utilizing a plurality of lid latches 19 to selectively secure the lid to the housing front wall. A housing top surface 18 is defined by the housing lid as a planar surface. A plurality of spaced parallel planar rigid support legs 20 extend orthogonally and rearwardly relative to the housing rear wall 13 terminating with feet 21 extending orthogonally relative to the legs for support of the cabinet housing 11 and associated structure, in a manner as illustrated in FIG. 4. The legs 20 and feet 21 also provide for support of workpieces severed and to be severed as well as support for various accessory power tools.

A handle rod 22 extends laterally and forwardly of the front wall 12 adjacent the second end wall 16 as an assisting grasp handle in manipulation of the organization. A first leg pair 24 are pivotally mounted to the bottom wall 14 adjacent the leg end wall 16, as illustrated. Electrical outlets 25 are directed through the front wall 13, with an electrical power supply cord 26 in electrical communication with the outlets to provide available and convenient electrical power for utilization with accessory tools and a miter saw 39 (see FIG. 6) mounted to the organization. It should be understood that additional electrical outlets, as required, may be directed through the rear wall 13.

A mounting platform 27 is longitudinally aligned with the cabinet housing 11 extending orthogonally relative to the first end wall 15 defining a mounting platform bottom wall 28 pivotally mounting a second leg pair 29 parallel to the first leg pair 24. A mounting platform first end wall 30 includes a "U" shaped mounting platform handle 32 that is utilized to assist in manipulation of the organization, as well as the "U" shaped front wall handles 23 due to the elongate nature of the organization requiring handles at various portions therealong for its manipulation and maneuvering. The mounting platform second end wall 31 is arranged in a contiguous integral mounting to the housing first end wall 15, with the mounting platform including a mounting platform top wall 33 spaced below the lid top surface 18 a predetermined spacing. The top wall 33 is arranged with various open areas to provide for support of various bracketry as required. For example, a lamp bracket and lamp to be stored on the cabinet housing 11 may be available to provide for additional illumination in use of the apparatus. A mounting platform rear wall 34 is defined by the mounting platform, wherein a mounting platform rear abutment flange 35 integrally mounted to a rear edge of the top wall is positioned adjacent the rear wall 34. Top wall pivot clamp legs 36 are provided to clamp an associated miter saw base plate 41 (see FIG. 6) that are mounted to top wall forward abutment flanges 37, wherein the miter saw base plate 41 is positioned between the top wall rear abutment flange 35 and the forward abutment flanges 37, with the pivot clamp legs 36 thereafter pivoted over the miter saw base plate 41 to secure the miter saw table 40 to the mounting platform top wall 33. Base plate 41 is defined by a predetermined thickness substantially equal to a predetermined height of the clamp legs 36 above the mounting platform top wall 33. The miter saw table top wall 42 is oriented with the miter saw 39 clamped to the mounting platform 27 in a coplanar alignment with the lid top surface 18 for directing a workpiece therealong.

Figure 5:
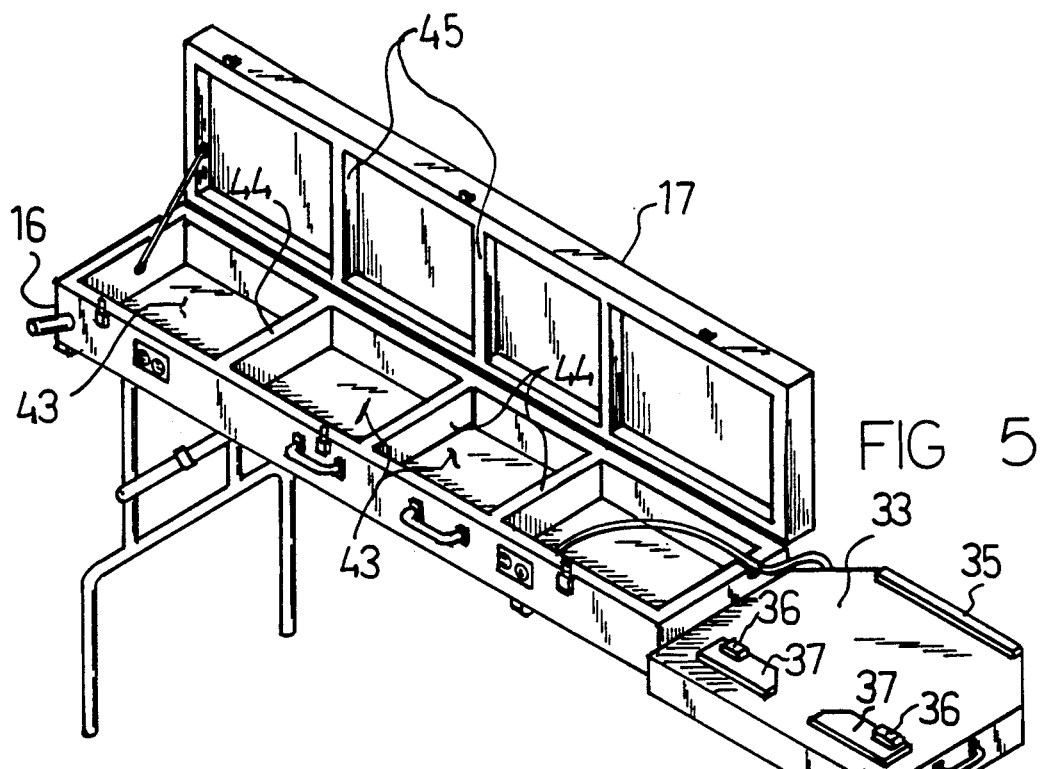
FIG. 5 is an isometric illustration of the invention with the cabinet housing in an opened orientation.
Figure 6:
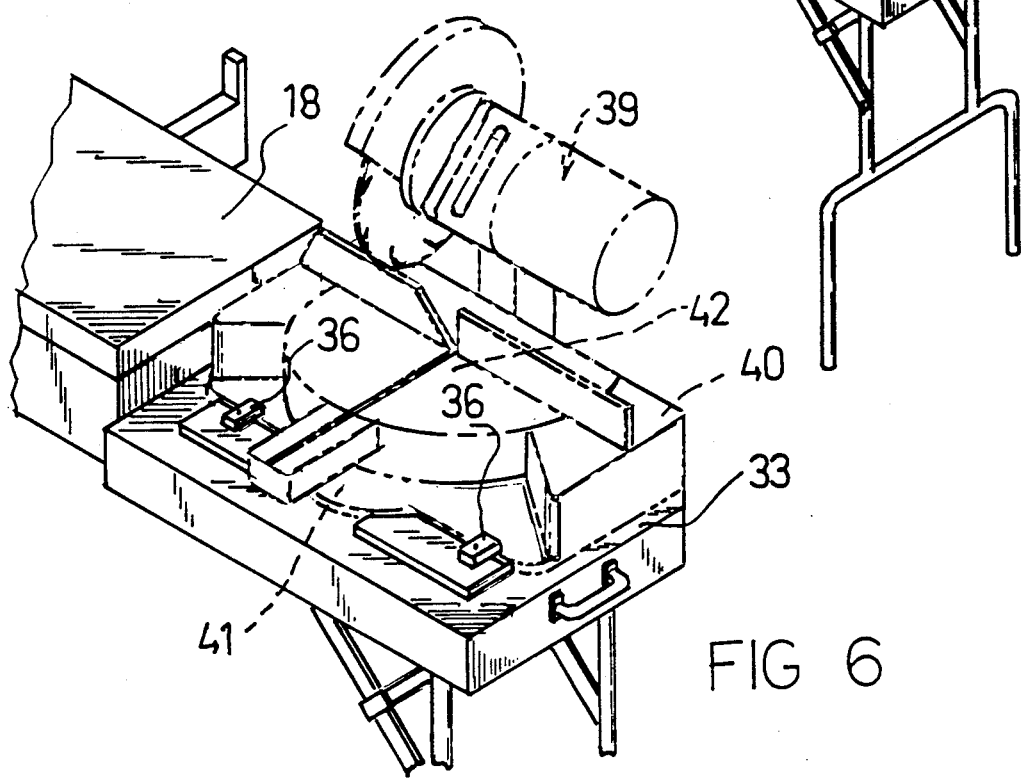
FIG. 6 is an isometric illustration of the invention illustrating the alignment of a top surface of an associated miter saw relative to the cabinet housing.

Reference to FIG. 5 illustrates a plurality of cabinet housing compartment chambers 43 defined within the cabinet housing 11 by partition walls 44 orthogonally oriented between the front and rear walls 12 and 13 respectively. The chamber partition walls 44 are aligned with respective lid partition walls 45 to provide for positioning of various components utilized in association with the saw table apparatus.

The modified apparatus 10a, as illustrated in the FIGS. 7 and 8, include front wall bores 46 arranged for reception of apertured tubes 47 therethrough that include tube heads 49 functioning as abutments to position the tube heads in contiguous communication with the housing front wall 12, while the apertured tubes 47 including desiccant powder 48 are directed within the chambers to maintain the chambers in a dry manner for the storage of equipment therewithin.

Further, first rollers 50, as illustrated, are selectively received within first roller cavities 51 defined by a height equal to one-half of the first roller diameter to provide for a rolling surface along the lid 17. Second rollers 52 orthogonally oriented relative to the first rollers and positioned on opposed sides of the first rollers include second roller axles 53 that are selectively positioned within second roller axle bores 54 that are orthogonally directed through the lid top surface 18 that cooperate with the first rollers 50 in the alignment of workpieces directed to the miter saw 39.

It should be noted that the miter saw blade and its associated fence is thereafter arranged for receiving of workpieces from the lid top surface 18, with the miter saw angularly oriented to provide for mitering cuts along a workpiece.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A miter saw table apparatus, comprising,
    a cabinet housing, the cabinet housing including a housing front wall spaced from and parallel a housing rear wall, with the housing further including a housing bottom wall coextensive with the housing front wall and the housing rear wall, and a housing first end wall spaced from and parallel a housing second wall, and a housing lid pivotally mounted to the housing rear wall, with the housing lid including at least one lid latch mounted to the housing lid and cooperative with a further lid latch mounted to the housing front wall to selectively secure the housing led to the housing front wall, and
    the housing lid including a housing planar top surface, and
    a platform integrally mounted to the housing first end wall, the housing platform defining a mounting platform bottom wall and a mounting platform top wall, wherein the mounting platform top wall is spaced below the housing planar top surface a predetermined spacing, and
    the housing bottom wall including a first leg pair pivotally mounted to the housing bottom wall adjacent the housing second end wall, and a second leg pair pivotally mounted to the mounting platform bottom wall, and
    a miter saw mounted to the mounting platform, and clamping means for securement of the miter saw to the mounting platform top wall.

2. An apparatus as set forth in claim 1 wherein the miter saw includes a miter saw base plate mounted to the mounting platform top wall, and the miter saw further including a miter saw table mounted to the base plate, wherein the miter saw table includes a miter saw table top wall, wherein the miter saw table wall is coplanar with the housing planar top surface, and the mounting platform includes a platform top wall rear abutment flange fixedly secured to the mounting platform top wall adjacent the mounting platform rear wall, and at least one forward abutment flange positioned in contiguous communication with a forward edge of the miter saw base plate, wherein at least one forward abutment flange includes a pivot clamp leg mounted thereto, wherein the pivot clamp leg is spaced above the mounting platform top wall a predetermined height substantially equal to a predetermined thickness defined by the miter saw base plate.

3. An apparatus as set forth in claim 2 wherein the housing front wall includes at least one "U" shaped handle mounted thereto, and the mounting platform includes a mounting platform first end wall, with the mounting platform first end wall including at least one mounting platform first end wall "U" shaped handle, and the mounting platform including a mounting platform second end wall in contiguous communication with the housing first end wall.

4. An apparatus as set forth in claim 3 including a plurality of parallel planar rigid support legs orthogonally and integrally mounted to the housing rear wall extending rearwardly of the housing rear wall, and each of the planar support legs includes a support leg foot laterally extending relative to an outer distal end of each support leg.

5. An apparatus as set forth in claim 4 wherein the housing includes a plurality of chambers defined within the housing, including a plurality of parallel partition walls integrally mounted within the housing defining adjacent chambers on opposed sides of each partition wall, and wherein each partition wall is orthogonally oriented and coextensive between the housing front wall and the housing rear wall within the housing, and the lid including a plurality of lid partition walls, wherein the lid partition walls are aligned with the chamber partition walls, and including a plurality of spaced front wall bores directed through the housing front wall, wherein each of the bores includes an apertured tube mounted therethrough, wherein the apertured tube includes desiccant powder contained therewithin, and each apertured tube includes a tube head, wherein the tube head defined a tube head diameter and the apertured tube defines an apertured tube diameter, wherein the tube head diameter is greater than the apertured tube diameter, and wherein each front wall bore defines a front wall bore diameter substantially equal to the apertured tube diameter.

6. An apparatus as set forth in claim 5 wherein the housing planar top surface includes a plurality of spaced parallel roller cavities, the roller cavities defined by a cavity height, and a plurality of first rollers, and a single roller of said plurality of rollers positioned within a single cavity within said plurality of roller cavities, wherein each of the first rollers is defined by a first roller diameter substantially equal to twice the cavity height, and each of the first rollers includes a plurality of second rollers positioned on opposed sides of each of the first rollers, wherein each of the second rollers is orthogonally oriented relative to each of the first rollers, and each of the second rollers includes a second roller axle, and including a plurality of second roller bores orthogonally directed through the planar top surface, wherein the second roller axle of each of said second rollers is selectively positioned within one of a plurality of said second roller bores.

* * * * *